June 25, 1946.                M. BEAN                2,402,528
METHOD OF MOLDING
Original Filed Aug. 1, 1940          2 Sheets—Sheet 1

Inventor
Morris Bean
Attorney

June 25, 1946.　　　　M. BEAN　　　　2,402,528

METHOD OF MOLDING

Original Filed Aug. 1, 1940　　　2 Sheets-Sheet 2

Inventor
Morris Bean
By
Attorney

UNITED STATES PATENT OFFICE 2,402,528

METHOD OF MOLDING

Morris Bean, Yellow Springs, Ohio

Original application August 1, 1940, Serial No. 349,032. Divided and this application May 18, 1943, Serial No. 487,528

5 Claims. (Cl. 18—59)

This invention relates to methods of making resilient patterns for use in molding of plaster and the like.

For a long time, in the art of molding, the advantages of using a flexible material for a pattern or mold have been recognized. Such flexible material can be pulled away from under-cut places without damage either to itself or the material molded against it, or to the material it is molded in, as the case may be. Hence, complex forms or shapes can be made, particularly of plaster of Paris, from a single pattern or mold, where a complex pattern or mold of many parts would have to be used if it were made of a rigid material.

The advantages to be gained in the use of flexible patterns are of particular interest for making molds bonded with plaster of Paris. It is a well known fact that mold materials containing a substantial proportion of plaster of Paris can be gauged with water and made to flow in around the pattern as a fluid plastic, which will subsequently "set" within a short space of time to a rigid solid having high strength and resistance to disintegration from mechanical abrasion.

There are, however, disadvantages connected with the use of flexible patterns or molds in some applications. It is apparent that a material pliable enough to offer distinct advantages in molding is also pliable enough so that it may not hold its shape within close limits of variation. In making a series of casts, the pattern or mold may not rest in exactly the same position twice, it may warp as internal strains tend to neutralize, or it may shrink on account of the volatilization of some of the ingredients.

It is accordingly an object of my invention to overcome these disadvantages and to provide a method of making a pattern structure free of irregularities and which is adapted to reproduce form and dimensions accurately in a large number of casts made upon it. Another object of the invention is to produce such a pattern which will be capable of long life and repeated re-use.

Another object of the invention is to provide a novel and economical method for producing the pattern in such a way as to avoid irregularities in the configuration sought.

Other objects and advantages will be apparent to those skilled in the art from the following specification.

I have overcome the difficulties set forth above by a number of expedients which advantageously are used together, but many of which may be used independently with improvement over patterns known prior to my invention. According to my invention, a pattern formed of a flexible resilient material is permanently attached to a rigid support which is fitted to the back of the pattern. The result of this is a flexible pattern held firmly and accurately by the rigid piece of material so that it always returns to the same shape. The necessary flexibility and resiliency is attained in the thickness of the material which is designed with this end in view, whereas, if the material is not made too thick between the back and the molding surface, the body of the pattern is held sufficiently rigid so that it will remain accurate, even in minute detail of its surface, when a soft or fluid mix of plaster or the like is poured over it and allowed to set.

Various flexible moldable materials may be used for my invention, but I have found great advantage in the use of a particular material known as "Korogel" or "Koroseal," available commercially under these names from the B. F. Goodrich Rubber Company. This is understood to be a vinyl chloride gel plasticized with cresyl phosphate, which is more particularly described in the Journal of Industrial and Engineering Chemistry, vol. 27, June, 1935, pages 667 to 672. Other resiliently elastic thermoplastic materials may be used, however. Soft rubber, with or without vulcanizing, may be used. The various synthetic rubber-like materials including, for example, "Duprene," "Thiokol," and various polymerization products.

In making a Korogel pattern, the following general procedure is to be followed:

The Korogel is heated to a temperature sufficiently high so that it becomes fluid and is poured or otherwise injected into the mold cavity and then allowed to cool.

After the Korogel is solidified, the mold may be opened by removing the back and the resulting pattern may thereafter be stripped from the face of the pattern mold. Advantageously, however, it is left in this mold until the rigid back is applied and set.

I then apply anchor means, distributed over substantially the entire area of the back. These are preferably metallic members which are heated so as to partially embed themselves in the thermoplastic body but to leave parts projecting which are later embedded in the material which forms the back. For this purpose wire coils have proven to be best adapted, since the opposite halves of the turns of the coil form loops which embed themselves completely in the thermo-plastic and the backing material respectively, giving thus closely spaced anchoring means with a minimum of labor in their application. If desired, the heating may be supplied uniformly throughout the coil by passing an electric resistance current through the entire coil after it has been laid in position on the back of the plastic pattern. The heating is discontinued and the coil cooled when parts of the loops are thus embedded in the thermo-plastic but while substantial parts of the loops which make up the coil still project from the thermo-plastic.

With such anchoring means secured to the back of the pattern, I then cast over this a body of plaster or other material which forms a substantially rigid back. This material flows in and around the loops of the wire coil or other anchoring means and gives a secure engagement between the flexible pattern and the rigid back. The flexible pattern, rigid back attached, is then removed from the front part of the mold.

The resulting pattern with its rigid back is now in condition for use in molding plaster, and the like, especially with plasters which are in substantially fluid condition so that they form easily about the surfaces of the flexible pattern without imposing stresses which would tend to distort the pattern. I have found that molded articles may be successively formed on a single pattern in large numbers and all will accurately reproduce the same surface form and dimensions.

My invention is applicable as well to molds for making positives as to patterns for making negative impressions for molding positives. The difference is essentially one of design of the product and use which does not fundamentally affect the operation of this invention. I shall, therefore, use the word "pattern" to include both types without reference to the technical distinction between "patterns" and "molds." It should be remembered, however, that a molding technique is used in making these flexible patterns. The mold used in making a pattern out of a thermo-plastic material is not to be confused in this discussion with such flexible molds herein referred to as "patterns" or with molds which may be made from the pattern after it is finished.

The invention here described may advantageously be used in conjunction with the inventions described and claimed in my copending applications Serial No. 349,032, filed August 1, 1940, now Patent No. 2,349,806, and Serial No. 487,527 filed herewith. It is so described in the example given below.

Although in the accompanying drawings I have shown a preferred embodiment of my invention and have described the same and various modifications thereof in this specification, it is to be understood that these are not intended to be either exhaustive or limiting of the invention, but, on the contrary, are chosen for the purposes of illustrating the invention in order that others skilled in the art may so fully understand the invention, its principles and the application thereof, that they may embody it and adapt it in numerous forms, each as may be best suited to the requirements of its particular use.

Referring to these drawings.

Figure 1:
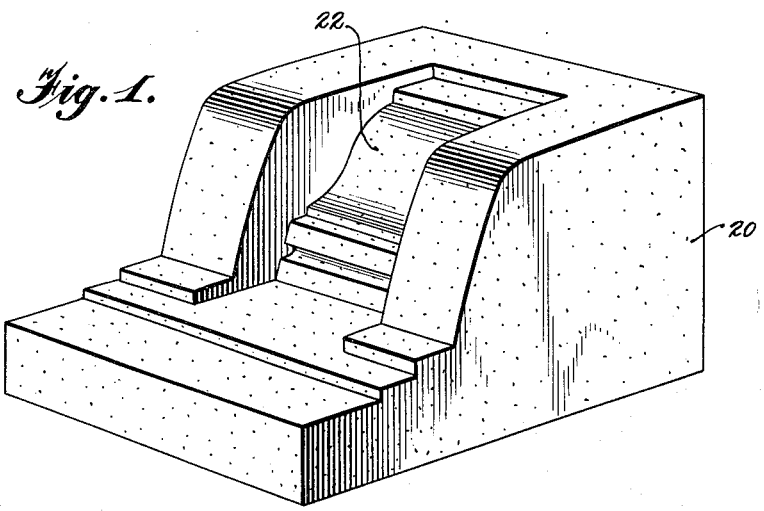
Figure 1 is a perspective view of a negative impression mold used as a master mold in forming flexible patterns.
Figure 2:
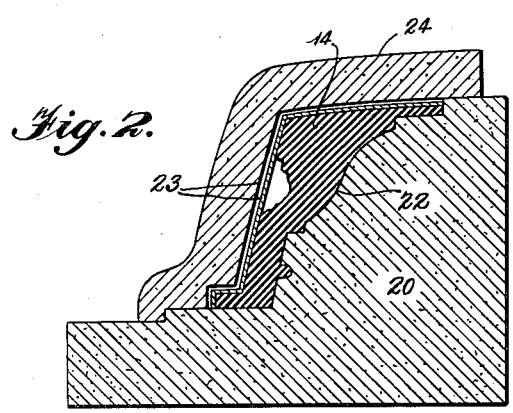
Figure 2 is a view in section of the master mold of Figure 1 showing the formed pattern in position and somewhat shrunken away from the backing.
Figure 3:
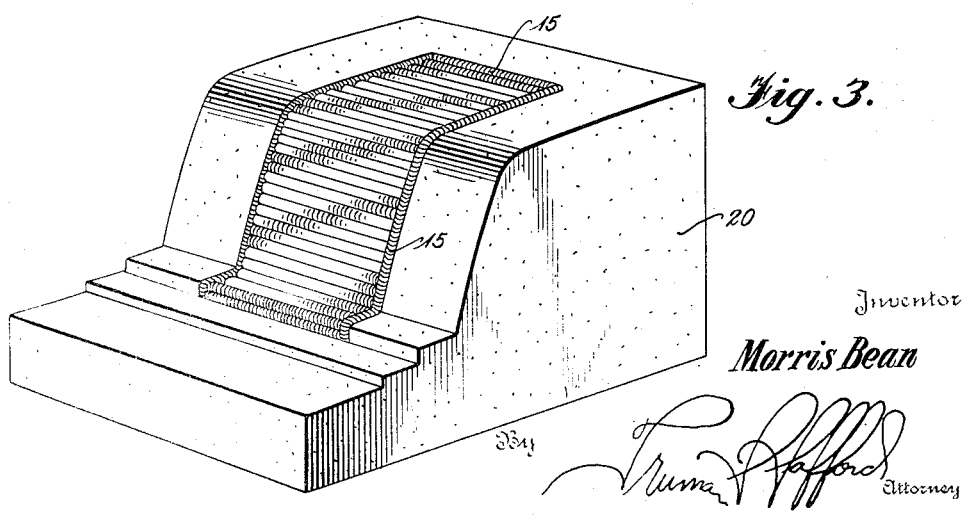
Figure 3 is a perspective view of the back of the flexible pattern still in place on the negative impression mold and with the anchoring coils affixed in the back of the pattern ready for application of the hardenable backing material.

In Figures 1, 2 and 3 I have shown the pattern and certain steps and apparatus used in its manufacture. Figure 1 shows the mold in which the thermoplastic is formed and given the desired pattern surface. In this I have used a negative impression mold 20, which may be modeled or carved in plaster, clay, hard wax, wood or other suitable material, or may be shaped by molding directly onto a surface which is to be reproduced in the pattern, for example, a plaster cast of the original. The surface of the mold cavity, particularly if a porous material such as plaster is used, is preferably impregnated with a high melting point wax, such as montan wax, advantageously a partially refined montan wax, or a phenolformaldehyde condensation resin such as Bakelite varnish may be used satisfactorily, to give a mold adhesion at the pattern face sufficient to prevent the Korogel from drawing away from the pattern face while it is congealing and yet adapted readily to be freed from the Korogel after it has congealed.

Other coatings or lubricating materials can be used on the face of the pattern mold instead of the wax or varnish; for example, the molds may be dusted with graphite, talc or bronzing powder, but always the treatment of this mold face at 22 is to be so related to the treatment of the face (at 23) of the back 24 as to have a substantially greater adhesion to the thermo-plastic molded in the cavity.

To this end, I preferably cover the back surface (at 23) of the cavity, away from the molding face 22, with a metal foil 23 which is free to pull away from the mold face proper and thus to accommodate the entire shrinkage of the thermo-plastic at the surface thus covered with foil. Other coatings than foil may be used for this purpose also. For example, a heavy coating of lubricating material such as graphite, talc or bronzing powder, may be used provided always that the adhesion at the molding face 22 is kept stronger than the adhesion at the face 23 where contraction is to be concentrated.

With the mold parts assembled, as shown in Figure 2, the hot fluid thermo-plastic is poured or otherwise injected into the mold, preferably under a substantial pressure, and is allowed to congeal and cool in the mold. After cooling the pattern is stripped from the mold and is then provided with the anchoring means in the manner illustrated in Figure 3.

In Figure 3, I have shown the completed flexible portion of the pattern with coils of wire 15 laid over its back and distributed over substantially the entire area of the back. These coils are then heated, for example, by pressing with a hot plate, by passing a resistance electrical current through them or by means of a fine Bunsen flame or otherwise, until a part of each turn is embedded in the thermo-plastic material; and is then cooled before the loops of the coil are filled with thermo-plastic. Thus a part of these turns are left projecting from the back, as shown for example in Figure 3, and the turns spaced for a plaster key.

Either before or after the application of the coils 15 an impervious coating may be applied to the back. If the metal foil has been used in the mold it may be left in position, but may make difficulty in applying the coils 15 unless the surfaces of the coil are sufficiently rough to puncture the foil or the foil is otherwise ruptured at the point where the coil contacts.

Figure 4:
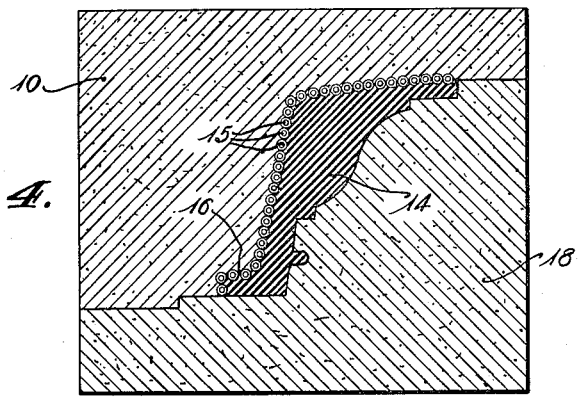
Figure 4 is a view in cross section of the pattern of Figure 3 after the cementitious backing has been applied but before the removal of the negative impression mold.

The pattern with these anchoring coils 15 and the impervious backing 16 is ready for application of the rigid backing 10. This I do preferably by placing the pattern thus prepared face down in a suitable mold and casting a plaster mix onto its back, thus forming in situ the rigid backing by which the flexible pattern is supported throughout its use, see Figure 4. The plaster mix or other plastic used for this purpose should be sufficiently fluid to flow around the wires of the coils 15 or other anchoring means or should be tamped lightly to force it around the anchoring means but at the same time to avoid distortion of the pattern.

When the backing has set the pattern with its backing keyed thereto throughout its area may be removed from the mold and is ready for use.

Figure 5:
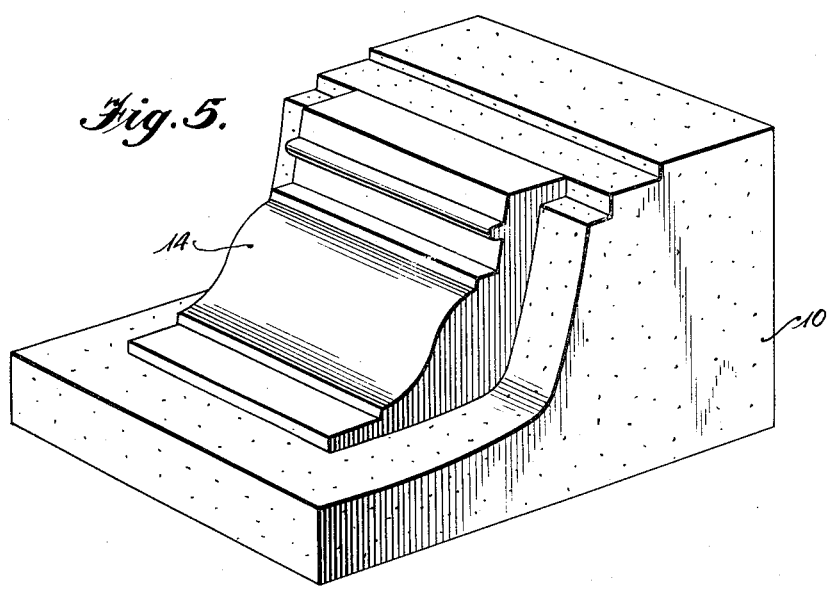
Figure 5 is a perspective view of the flexible pattern and backing after removal of the negative impression mold.

In Figure 5, I have shown a finished pattern assembled on its rigid backing which constitute together a pattern for molding plaster and the like, e. g., in the manufacture of plaster molds for metal casting. The rigid backing shown at 10 is, in the preferred case, made of plaster, cast in situ onto the back of the flexible pattern 14, which, as already stated above, in the preferred case, is composed of Korogel. At 15, I have shown the wire coils mentioned above, by which the pattern 14 is anchored to the rigid backing 10, and at 16 between the backing 10 and the pattern 14 is a layer of impervious material, advantageously paraffin wax.

The plaster body 18 is made by pouring the plaster over the pattern 14, as is well known in connection with ordinary plaster molding technique. When the plaster has set and the molding is, therefore, complete, the flexible pattern 14 is readily stripped from the molded article by reason of its smooth surface and its resilient flexibility, whereas, it is held securely to the rigid backing 10 by means of the anchoring coils 15; and, by reason of the distribution of these coils, the stripping of the flexible material from the mold takes place without any concentration of the stresses which might tear or permanently deform the flexible pattern.

Figure 6:
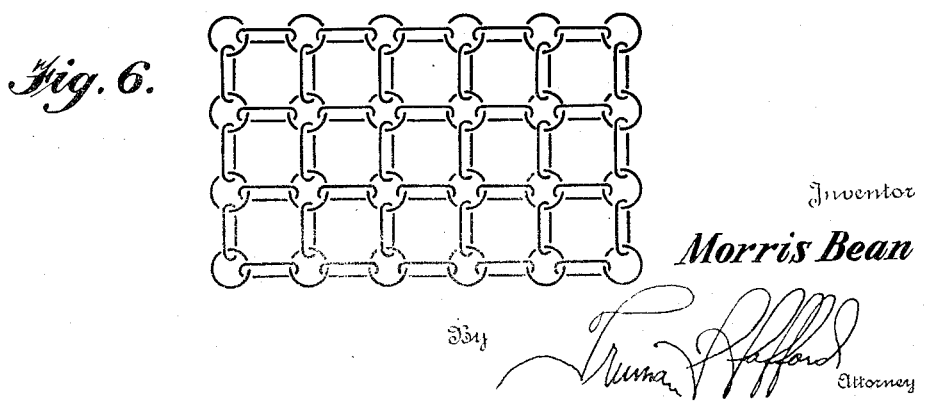
Figure 6 is a plan view showing a chain link fabric which may be used instead of wire coils for bonding the flexible pattern to its backing.

In Figure 6, I have shown another example of an anchoring means suitable for use in my invention. This is a chain mail fabric, which can be partially embedded in the thermo-plastic and the backing in the same way as the wire coils already described. It has the advantage that it can be cut to the size and shape of the back of the mold, laid over it and heated to embed itself in the mold all with somewhat less labor than with the coils.

This application is a division of my prior application Serial No. 349,032, filed August 1, 1940, now Patent No. 2,349,806.

What I claim is:

1. The method of making patterns for molding plaster and the like which comprises forming a flexible resilient thermo-plastic in a negative impression mold, placing on the back of the resulting thermo-plastic pattern a series of wire coils distributed over the area of said back, heating said coils until they are partially embedded in said thermo-plastic, cooling them while a part of the respective turns of the coil project as loops from the back, and casting over said back a hardenable fluid mix.

2. The method of making patterns for molding plaster and the like which comprises forming a flexible resilient thermo-plastic composition to a desired pattern form, placing on the back of the resulting thermo-plastic pattern a series of anchoring means comprising flexibly connected metallic members positioned transverse to, and distributed over the area of, said back, heating said anchoring means until they are partially embedded in said thermo-plastic, cooling them while parts of said metallic members respectively project from the back, and casting over said back a hardenable fluid mix.

3. The method of making patterns for molding plaster and the like which comprises forming a flexible resilient thermo-plastic composition to a desired pattern surface, placing on the back of the resulting pattern a series of closely spaced wire loops edgewise to said back of the pattern, heating the loops whereby they melt their way into said thermo-plastic, cooling said loops while a portion thereof still projects above said back, and flowing over said back and around and under the exposed portions of said loops a hardenable backing material and setting said material to a substantially rigid backing.

4. The method of making patterns for molding plaster and the like which comprises forming a flexible resilient thermo-plastic composition to a desired pattern surface, placing on the back of the resulting pattern coiled wire closely spaced over the area of said back of the pattern, heating the coils whereby they melt their way into said thermo-plastic, cooling said coils while portions of the respective loops thereof still project above said back, and flowing over said back and around and under the exposed portions of said loops a hardenable backing material and setting said material to a substantially rigid backing.

5. The method of making patterns for molding plaster and the like which comprises forming a flexible resilient thermoplastic in a negative impression mold, placing on the back of the resulting thermoplastic pattern a chain mail fabric having links substantially parallel to the surface of said back and links interengaging therewith lying transverse to said surface, heating the said links until they are partially embedded in said thermoplastic, cooling them while parts of said transverse links still project from the back and casting over said back a hardenable fluid mix.

MORRIS BEAN.